United States Patent
Utsunomiya et al.

(10) Patent No.: US 7,430,195 B2
(45) Date of Patent: Sep. 30, 2008

(54) WIRELESS COMMUNICATION SYSTEM AND WIRELESS COMMUNICATION APPARATUS

(75) Inventors: Yoriko Utsunomiya, Tokyo (JP); Tomoko Adachi, Urayasu (JP); Masahiro Takagi, Tokyo (JP); Tetsu Nakajima, Yokohama (JP); Tomoya Tandai, Tokyo (JP); Yasuyuki Nishibayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 365 days.

(21) Appl. No.: 11/159,341

(22) Filed: Jun. 23, 2005

(65) Prior Publication Data
US 2006/0013184 A1    Jan. 19, 2006

(30) Foreign Application Priority Data
Jun. 24, 2004    (JP) .............................. 2004-187032

(51) Int. Cl.
H04Q 7/24    (2006.01)
H04Q 7/00    (2006.01)
H04B 7/00    (2006.01)
H04J 1/00    (2006.01)
H04L 12/413    (2006.01)

(52) U.S. Cl. ....................... 370/338; 370/310; 370/328; 370/343; 370/445

(58) Field of Classification Search ................. 370/310, 370/328, 338, 343, 445
See application file for complete search history.

(56) References Cited
U.S. PATENT DOCUMENTS 7,016,673 B2 * 3/2006 Reddy et al. ............. 455/426.2
7,248,570 B2 * 7/2007 Bahl et al. .................. 370/329
2004/0038660 A1    2/2004 He et al.
2004/0052273 A1 * 3/2004 Karaoguz et al. ........... 370/465
2004/0218683 A1 * 11/2004 Batra et al. ................. 375/261
2005/0208966 A1 * 9/2005 David et al. .............. 455/553.1

(Continued)

FOREIGN PATENT DOCUMENTS

EP    1 227 629 A1    7/2002

(Continued)

OTHER PUBLICATIONS

Translation of Kokai.*

(Continued)

Primary Examiner—Lester Kincaid
Assistant Examiner—Nathan Mitchell
(74) Attorney, Agent, or Firm—Oblon, Spivak, McClelland, Maier & Neustadt, P.C.

(57) ABSTRACT

A wireless communication system having wireless terminal stations to perform direct communication without passing through a wireless base station. This system includes a wireless communication device which performs either a first wireless communication using a first channel having a first frequency band or the second wireless communication using a second channel having a second frequency band with a bandwidth greater than that of the first frequency band. This system also includes a generation device which generates a switching control frame to control switching between a communication period by the first wireless communication and a communication period by the second wireless communication, and a communication control device which controls the wireless communication device so as to transmit the switching control frame. A wireless terminal station is selected as a temporal central control station having a switching control right to control switching between the first and second wireless communications.

21 Claims, 11 Drawing Sheets

U.S. PATENT DOCUMENTS

2006/0013184 A1 1/2006 Utsunomiya et al.
2006/0282518 A1* 12/2006 Karaoguz et al. ........... 709/221

FOREIGN PATENT DOCUMENTS

| JP | 2003-87856 | 3/2003 |
| JP | 2003-224514 | 8/2003 |
| JP | 2004-534480 | 11/2004 |

OTHER PUBLICATIONS

"Understanding Ad Hoc Mode", www.wi-fiplanet.com/tutorials/article/php/1451421, XP-002346939, Aug. 23, 2002, pp. 1 and 2.
U.S. Appl. No. 11/557,636, filed Nov. 8, 2006, Takagi et al.
U.S. Appl. No. 11/857,841, filed Sep. 19, 2007, Utsunomiya et al.

* cited by examiner

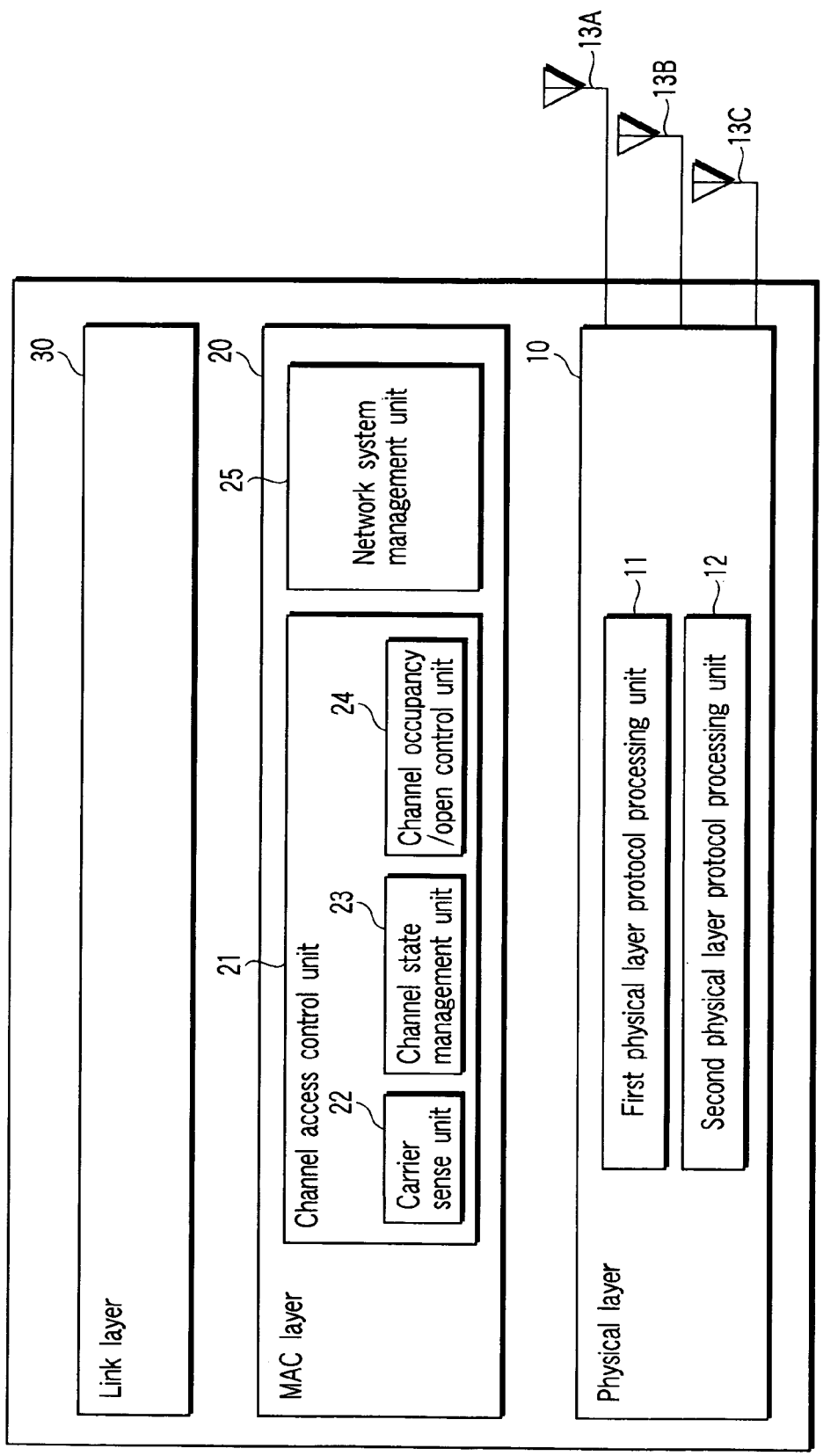
F I G. 1

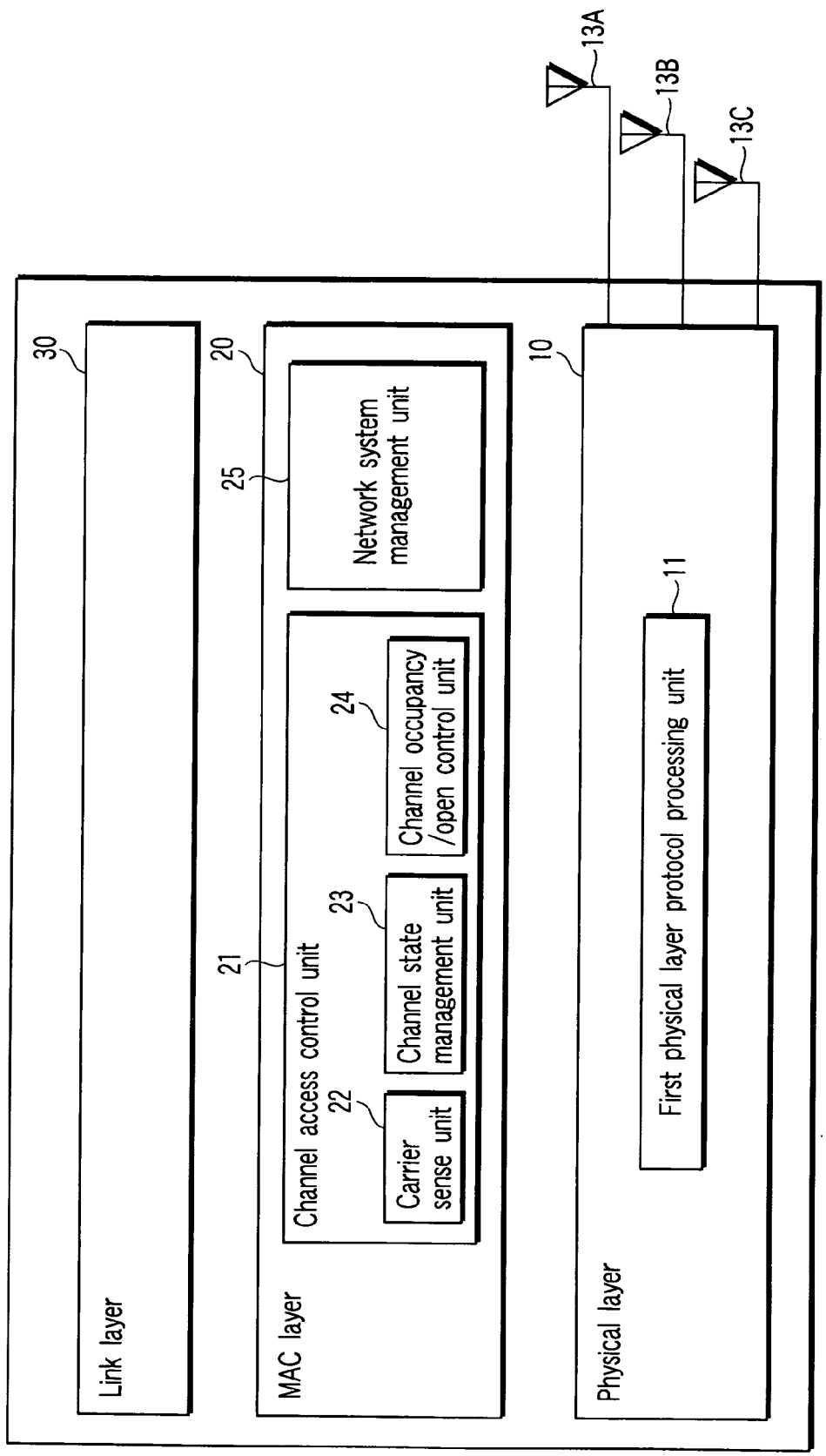
F I G. 2

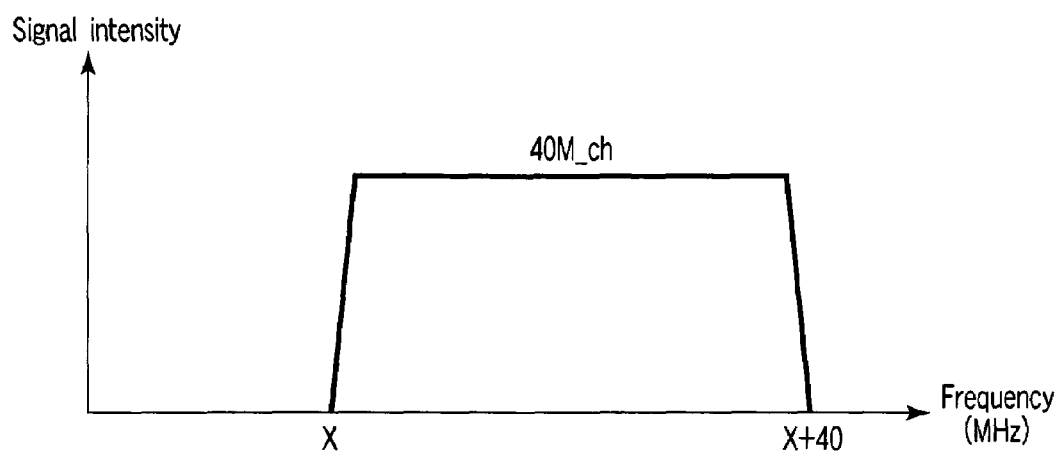
F I G. 4A
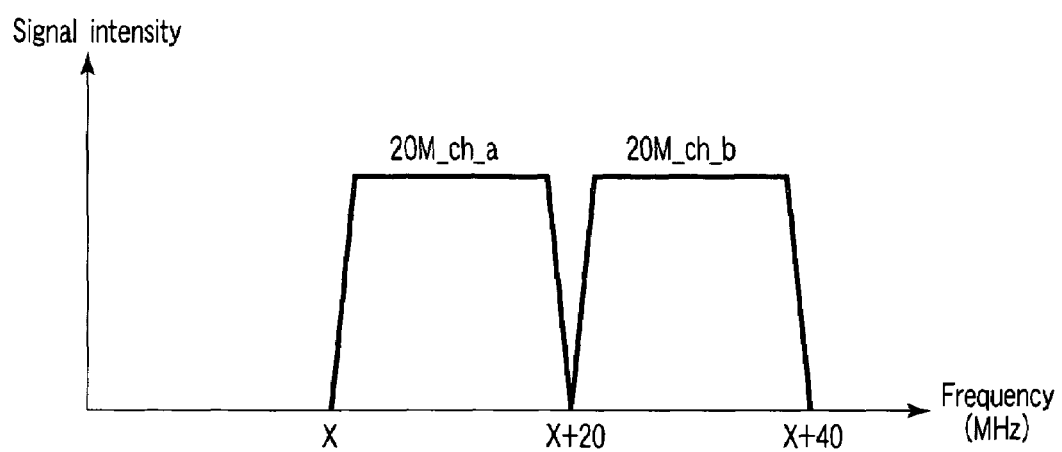
F I G. 4B

WIRELESS COMMUNICATION SYSTEM AND WIRELESS COMMUNICATION APPARATUS

CROSS-REFERENCE TO RELATED APPLICATIONS

This application is based upon and claims the benefit of priority from prior Japanese Patent Applications No. 2004-187032, filed Jun. 24, 2004, the entire contents of which are incorporated herein by reference.

BACKGROUND OF THE INVENTION

1. Field of the Invention

The present invention relates to a wireless communication system and a wireless communication apparatus by which a plurality of wireless communication apparatuses make wireless communication with one another by sharing a plurality of different frequency channels.

2. Description of the Related Art

Media access control (MAC) is control that determines how a plurality of communication apparatuses for communicating by sharing the same medium should utilize the medium and transmit communication data. As a result of performing MAC, even if two or more communication apparatuses simultaneously transmit communication data by utilizing the same medium, occurrences of events (so-called collisions) such that a communication apparatus on a receiving side can not make the communication data separable are decreased. An event such that the medium is not used by any communication apparatus regardless of existence of a communication apparatus having a request for transmission is also decreased as a consequence of performing MAC.

In wireless communication, since it is hard for the communication apparatus to monitor transmission data while transmitting the transmission data, MAC without assuming detection of the collision is required. IEEE 802.11 being a representative technical standard for a wireless local area network (LAN) adopts carrier sense multiple access with collision avoidance (CSMA/CA).

CSMA/CA in IEEE 802.11, sets a period (referred to as duration) until a series of sequences composed of one or more frame exchange following a MAC frame to a header of the MAC frame. During the duration, the communication apparatus having little relation to and having no transmission right of the sequences stands ready for transmission by determining a virtual occupancy state of the medium. Thereby, the occurrence of the collision is avoided. In contrast, the communication apparatus having the transmission right in the sequences comes to know that the medium is not used other than the period in which the medium is actually occupied.

IEEE 802.11 defines that a state of the medium is determined by a combination of virtual carrier sense in a MAC layer such as the former and physical carrier sense in a physical (PHY) layer such as the latter and the MAC is executed on the basis of the determination.

Jpn. Pat. Appln. KOKAI Publication No. 2003-87856 discloses a method for achieving a wireless base station capable of being shared in a plurality of wireless LAN systems in a system in which a plurality of wireless LAN systems differing in PHY layer are coexisting. Specifically, the wireless base station alternately generates a first notification signal in a first PHY layer and a second notification signal in a second PHY layer to transmit them to a wireless terminal and switches over the first and the second PHY layers in synchronous with the first and the second notification signals. The base station makes it possible for the wireless terminal corresponding to the first PHY layer to access only within a specified time from the transmission time of the first notification signal and makes it possible for the wireless terminal corresponding to the second PHY layer to access only within a specified time from the transmission time of the second notification signal.

IEEE 802.11 adopting CSMA/CA has been speeding up communication speed by mainly changing a protocol of a PHY layer up to this day. For the 2.4-GHz band, IEEE 802.11 (established in 1997, communication speed=2 Mbps) has changed to IEEE 802.11b (established in 1999, communication speed=11 Mbps) and further to IEEE 802.11g (established in 2003, communication speed=54 Mbps). For the 5-GHz band, only IEEE 802.11a (established in 1999, communication speed=54 Mbps) currently exists as a standard specification.

As for one approach to speed up the communication speed, a method of increasing the bandwidth of a channel is usable. In a method of expanding the bandwidth of the channel, a channel having a certain bandwidth and another channel having a bandwidth greater than that of the certain channel coexist in a certain frequency band. Conventional CSMA/CA, however, is designed so as to perform access control for a single channel, so that it cannot perform MAC for a plurality of channels having different bandwidths.

The easiest MAC system for a plurality of channels having different bandwidths coexisting in the same frequency band includes a system in which a central control station manages every MAC. For example, in the IEEE 802 wireless LAN system, an access point (AP) can manage every MAC. In recent years, an ad hoc network for directly transmitting and receiving data to be transmitted from one mobile station to another mobile station without passing though the central control station is paid attention in an advantage to enable preventing transmission efficiency from being degraded due to the passing of the data through the central control station. Such a wireless communication system in which the central control station does not exist, however, cannot use the resolving means described above.

BRIEF SUMMARY OF THE INVENTION

In view of the foregoing problem, it is an object of the invention to provide a wireless communication system, a wireless communication method and a wireless communication apparatus capable of performing MAC for a plurality of channels having different bandwidths coexisting in the same frequency band in a wireless communication system to make direct communication among wireless terminal stations without passing through a central control station.

According to one aspect of the present invention, there is provided a wireless communication system having a plurality of wireless terminal stations to perform direct communication without passing through a wireless base station. This system includes a wireless communication device configured to perform either a first wireless communication using a first channel having a first frequency band or the second wireless communication using a second channel having a second frequency band with a bandwidth greater than that of the first frequency band. This system also includes a generation device configured to generate a switching control frame to control switching between a communication period by the first wireless communication and a communication period by the second wireless communication, and a communication control device configured to control the wireless communication device so as to transmit the switching control frame generated by the generation device. A wireless terminal station is selected as a temporal central control station having a switching control right to control switching between the first wireless communication and the second wireless communication.

A wireless communication system according to embodiments of the present invention includes a plurality of wireless terminal stations to perform direct communication without passing through a wireless base station, the plurality of wireless terminal stations each performing either first wireless communication using a first channel having a first frequency band or second wireless communication using a second channel having a second frequency band with a bandwidth greater than that of the first frequency band, wherein a switching control right owner having a switching control right to control switching between a communication period by the first wireless communication and a communication period by the second wireless communication is selected from the plurality of wireless terminal stations.

BRIEF DESCRIPTION OF THE SEVERAL VIEWS OF THE DRAWING

FIG. 1 is an illustration showing a configuration of a terminal regarding a first embodiment of the invention;

FIG. 2 is an illustration showing a configuration of another terminal of the first embodiment;

FIGS. 4A and 4B are schematic illustrations in an example of the network configuration regarding the first embodiment;

DETAILED DESCRIPTION OF THE INVENTION

Figure 3:
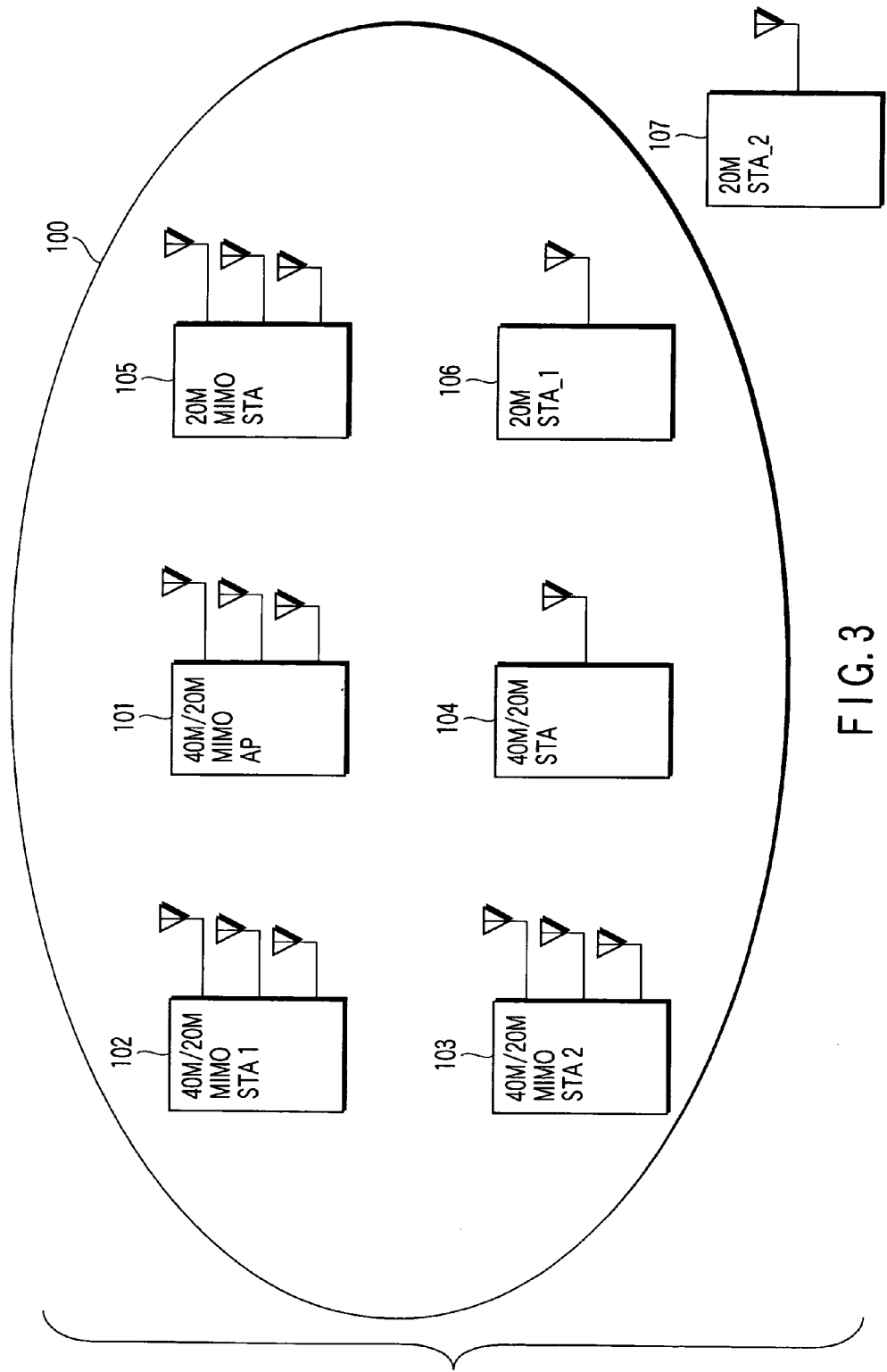
FIG. 3 is an illustration explaining a network configuration regarding the first embodiment.

Embodiments of the invention will be explained by referring to the drawings.

A wireless communication system for searching a frequency channel before making communication includes a wireless LAN system on the basis of IEEE Std. 802.11-1999 (revision 2003 includes ISO/IEC 8802-11: 1999 (E) ANSI/IEEE Std. 802.11, 1999 edition, IEEE Std. 802.11a-1999, IEEE Std. 802.11b-1999, IEEE Std. 802.11b-1999/Cor 1-2001 and IEEE Std. 802.11d-2001). Hereafter, a basic system configuration will be explained in accordance with the IEEE 802.11 wireless LAN system. The IEEE 802.11 Std. is the standard specification with respect to a PHY layer and a MAC layer. The following process will be explained by mainly taking notice of the process in the MAC layer. The IEEE 802.11 standard specification also includes a standard specification positioned as an amendment or a recommended practice thereof.

First Embodiment

As shown in FIG. 1, a wireless communication apparatus in accordance with a first embodiment of the invention includes a PHY layer 10, a MAC layer 20 and a link layer 30 by roughly classifying. In FIG. 1, the PHY layer 10 corresponds to two kinds of PHY layer protocols differing in bandwidth in use. That is, the PHY layer 10 has a first PHY layer protocol processing unit 11 for performing PHY layer protocol processing to communicate by using a first channel with a first communication bandwidth and a second PHY layer protocol processing unit 12 for performing PHY processing to communicate by using a second channel having a second communication bandwidth greater than that of the first communication bandwidth and overlapping with the first communication bandwidth. The first processing unit 11 and the second processing unit 12 frequently sharing a circuit with each other in terms of actual mounting and they are not exactly independent with each other.

The protocol processed in processing of the first processing unit 11 includes at least, for example, the PHY protocol defined by IEEE 802.11a. The first band width used by the first processing unit 11 is set, for example, to 20 MHz. The first processing unit 11 may use a technique so called a multiple input multiple output (MIMO) by which each of a plurality of antennas 13A-13C is used on a transmission side and a reception side, respectively. The MIMO technique is one with a high possibility to be applied to an IEEE 802.11 task group n (TGn) intending to achieve higher throughput of IEEE 802.11.

The second processing unit 12 uses, for example, either a single input single output (SISO) or the MIMO, technique or both techniques. The second communication band width used by the second processing unit 12 is set, for example, to 40 MHz. The first communication band width exists in the second communication band width.

The MAC layer 20 includes a channel access control unit 21 which has a carrier sense unit 22, a channel state management unit 23 and a channel occupancy/open control unit 24. The MAC layer 20 performs the exchange of data with the PHY layer 10 and controls the PHY layer 10 by control signals. PHY layer 10 performs a signal processing with respect to data received from the MAC layer 20 in accordance with the indication from the MAC layer 20. This indication may represents which one of the first PHY layer protocol processing unit 11 and the second PHY layer protocol processing unit 12 should be selected to process the outstanding data. The data is processed by one of the first PHY layer protocol processing unit 11 and the second PHY layer protocol processing unit 12 and is transmitted from the antennas 13A-13C.

On the contrary, data received by the antennas 13A-13C is decoded by the first PHY layer protocol processing unit 11 or the second PHY layer protocol processing unit 12, and the decoded data is forwarded from the PHY layer 10 to the MAC layer 20. Note here again that not only data but also control signals are exchanged between the PHY layer 10 and the MAC layer 20. For instance, a control signal for instructing the PHY layer 10 to toggle (with respect to data signals to be processed) between the first PHY layer protocol processing unit 11 and the second PHY layer protocol processing unit 12 is provided from the MAC layer 20 to the PHY layer 10.

The MAC layer 20 further includes a network system management unit 25. The management unit 25 generates a beacon frame and manages association and appropriately expands the network system. The management unit 25 also controls the channel access control unit 21. Specifically, the management unit 25 acquires and stores terminal information in the network, and determines switching over the first PHY layer protocol processing unit 11 and the second PHY layer protocol processing unit 12 based on the terminal information. The determined switching indication is propagated to the channel access control unit 21 in the MAC layer. The channel access control unit 21 instructs the channel occupancy/open control unit 24 to generate a control frame responsive to the switching indication. The control frame is forwarded, together with a control signal, to the PHY layer 10.

The carrier sense unit 22 manages an empty/occupancy (idle/busy) state of a channel by managing a carrier sense state with a combination of actual carrier sense information acquired from the PHY layer 10 and virtual carrier sense information acquired by the protocol of the MAC layer 20. That is the carrier sense unit 22 does not manage a single idle/busy state but manages idle/busy states more than one first channel in the first bandwidth and more than one second channel in the second bandwidth.

The channel occupancy/open control unit 24 generates frames to control the virtual carrier sense state of the MAC layer 20 necessary to occupy a channel for a specified period or open the occupied channel. The frames generated by the control unit 24 are transmitted to the PHY layer 10 and transmitted by the first processing unit 11 and the second processing unit 12.

The channel state control unit 23 make the first and the second protocol processing units 10, 12 of the carrier sense unit 22, the control unit 24 and the PHY layer 10 cooperatively operate so as to perform desired channel access control.

As a specific example of the wireless communication apparatus which is shown in FIG. 1, for example, a 40-/20-MHz MIMO STA (AP) and a 40-/20-MHz STA (AP) are presented. The 40-/20-MHz MIMO STA (AP) is a terminal (or AP) capable of transmitting and receiving the SISO through the 20-MHz channel, the MIMO through the 20-MHz, the SISO through the 40-MHz and the MIMO through the 40-MHz. The 40-/20-MHz STA (AP) is a terminal (or AP) capable of transmitting and receiving the SISO through the 20-MHZ channel and the MIMO through the 40-MHz. In terms of the Link layer 30, it is assumed that to have a function of a usual link layer defined in IEEE 802.

Another wireless communication apparatus shown in FIG. 2 differs from the wireless communication apparatus shown in FIG. 1 in a point of view that the PHY layer 10 does not include the second PHY protocol processing unit 12 shown in FIG. 1. The another wireless communication apparatus shown in FIG. 2 are common to the communication apparatus shown in FIG. 1 in the following points: the first communication bandwidth of the first PHY layer protocol processing unit 11 is 20 MHz in nominal terms; the MIMO technique may be or may not be included; and the MAC layer 20 and the link layer 30 are provided.

Since the wireless communication apparatus shown in FIG. 2, however, only performs the MAC based on the first processing unit 11, the detail in operations of the MAC layer 20 in FIG. 2 partially differs from the communication apparatus shown in FIG. 1. If the processing unit 11 does not include the MIMO technique, the communication apparatus shown in FIG. 2 may be an existing apparatus corresponding at least one of IEEE 802.11a, IEEE 802.11b and IEEE 802.1g.

A specified example of the communication apparatus shown in FIG. 2 includes, for example, the 20-MHz MIMO STA (AP) and 20-MHz STA (AP). The 20-MHz MIMO STA (AP) is a terminal (or AP) capable of transmitting and receiving the SISO through the 20-MHz channel and the MIMO through the 20-MHz. The 20-MHz STA (AP) is a terminal (or AP) capable of transmitting and receiving the SISO through the 20-MHz.

An example of a network 100 including the wireless communication apparatus shown in FIG. 1 and FIG. 2 is shown in FIG. 3. A base station 101 in the network 100 is an AP corresponding to the 40-/20-MHz MIMO AP. Terminals 102-106 establish association with the base station 101. Here, the terminal 102 is a 40-/20-MHz MIMO STA_1, the terminal 103 is a 40-/20-MHz MIMO STA_2, the terminal 104 is a 40-/20-MHz STA, the terminal 105 is a 20-MHz MIMO STA, and the terminal 106 is a 20-MHz MIMO STA_1. Another terminal 107 is a 20-MHz MIMO STA_2 and assumed that it belongs to a network other than the network 100, for example, a network using 20M_ch_b.

The network shown in FIG. 3 has a channel 20M_ch_a of 20 MHz using a frequency band of X MHz–(X+20) MHz and a channel 40M_ch of 40 MHz using a frequency band of X MHz–(X+40) MHz as communication channels as schematically shown in FIG. 4. Accordingly, the frequency band of the X MHz–(X+20) MHz is redundantly used both 20-MHz and 40-MHz channels. Another channel 20M_ch_b of 20 MHz using the frequency band of (X+20) MHz–(X+40) MHz is not used by the network 100 shown in FIG. 3, but used occasionally in other network.

In the network 100, a channel 40M_ch of 40 MHz and either of two channels 20M_ch_a or 20M_ch_b of 20 MHz overlapping with the 40M_ch in frequency are used. In other words, it is assumed that the 40-/20-MHz MIMO STA and the 40-/20-MHz STA belonging to the network 100 do not to simultaneously treat the 20M_ch_a and the 20M_ch_b.

Figure 5:
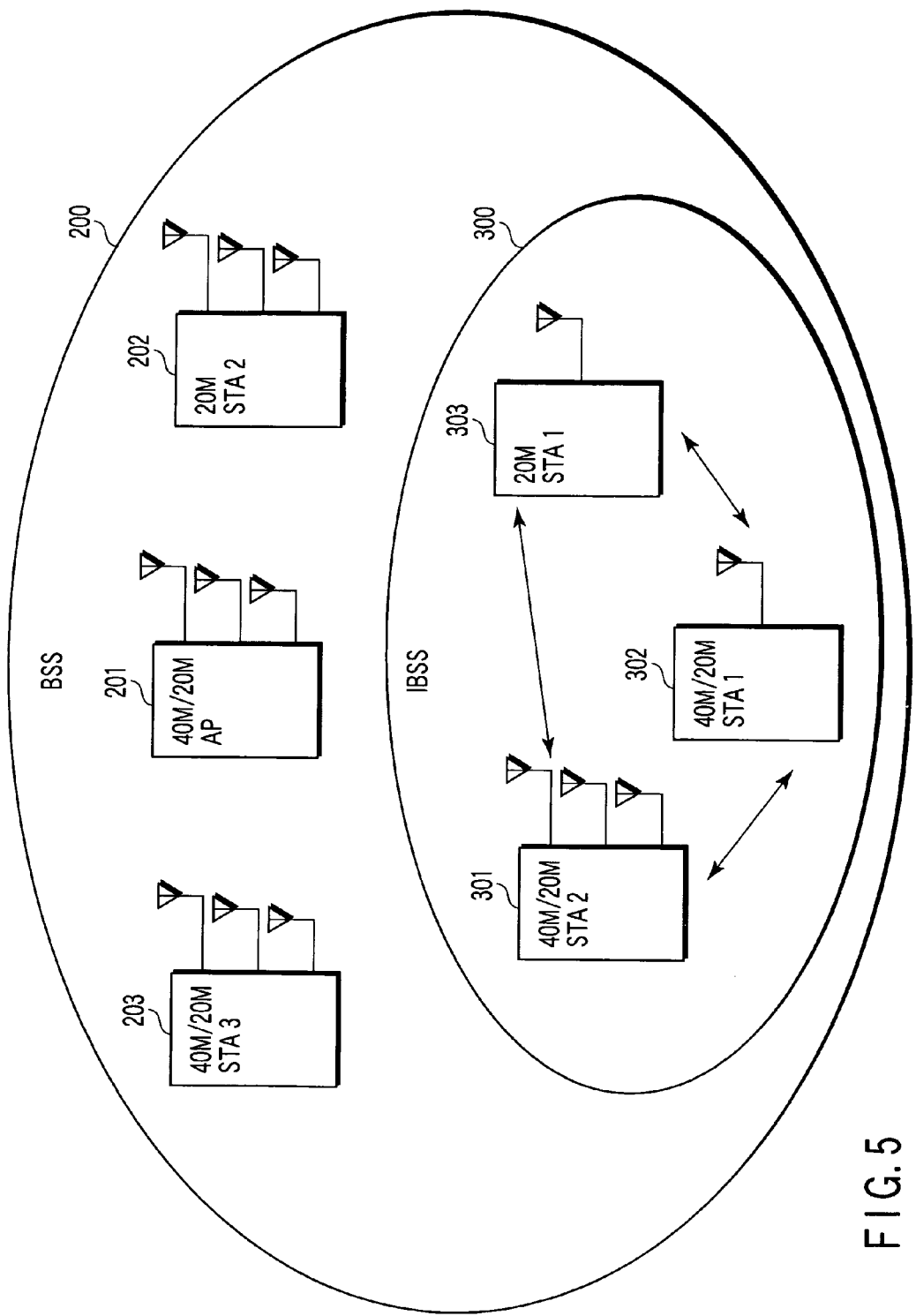
FIG. 5 is an illustration explaining an another network configuration regarding the first embodiment.

In the first embodiment, in the network especially shown in FIG. 3, the case in which terminals directly communicate with one another without passing through the base station (AP) is considered. FIG. 5 shows such a network 200. In the network 200 in FIG. 5, a network 300 in which a 40-/20-MHz STA 1, a 40-/20-MHz STA 2 and a 20-MHz STA 1 (terminals 301-303) directly communicate with one another without passing through a base station (AP) is formed, and this case is corresponded to an independent basic service set (IBSS). The network 200 corresponds to a basic service set (BSS) and makes a terminal 202 (20-MHz STA 2) and a terminal 203 (40-/20-MHz STA 3) communicate with each other with passing through a base station 201 (40-/20-MHz AP).

Figure 6:
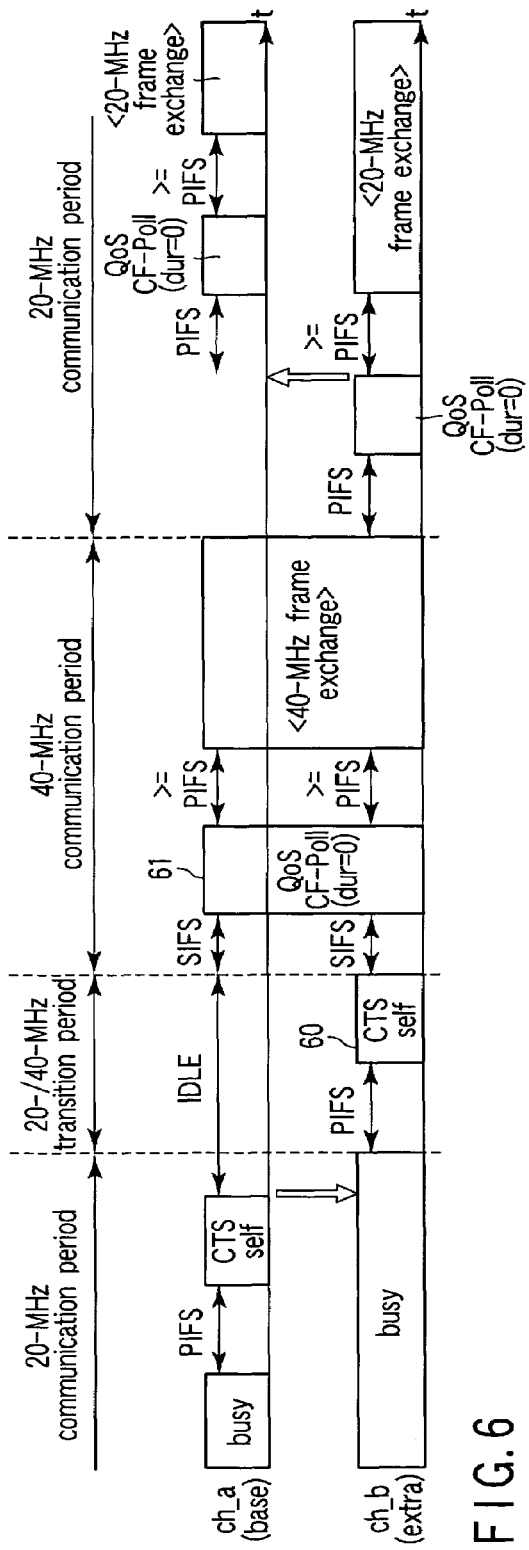
FIG. 6 is an illustration explaining a media access system regarding the first embodiment.

As shown in FIG. 5, in the case that the terminal 301 (40-/20-MHz STA) capable of using any one of the 40-MHz channel and 20 MHz channel and the terminal 303 (20-MHz STA) capable of using only the 20-MHz channel coexist in the network 300, for example, a system shown in FIG. 6 is considered as a media access system. In the case of using the media access system shown in FIG. 6, a central control station is required to transmit control information 60, 61 such as a CTS self and a QoS CF-Poll and intensively control switching over between a 20-MHz communication period and a 40-MHz communication period. Therefore, in the network 300 in which the control station does not interpose as the IBSS in FIG. 5, a temporal central control station (referred to as "20-/40-MHz switching owner") to intensively control the switching between the 20-MHz communication period and the 40-MHz communication period is required. The 20-/40-MHz switching owner is selected from any one of the terminals in the network 300 as explained below. Hereinafter, the network 300 shown in FIG. 5 will be referred to as merely "IBSS".

Figure 7:
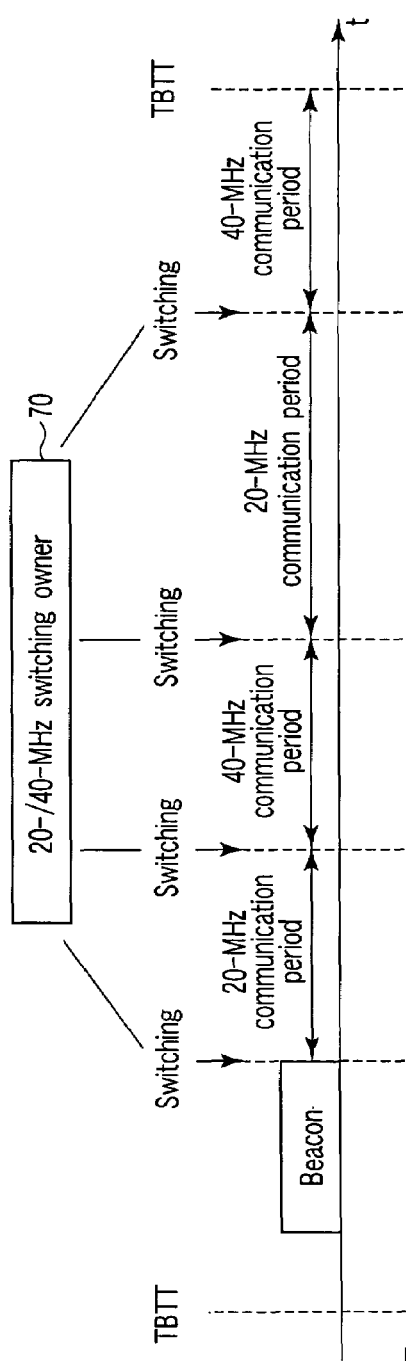
FIG. 7 is an illustration showing a configuration of a terminal regarding the first embodiment.

FIG. 7 is an illustration showing switching of communication periods in the IBSS. The kinds of the communication periods include the 40-MHz communication period using the channel of 40 MHz and the 20-MHz communication period using the channel of 20 MHz. A 20-/40-MHz switching owner 70 is a main body of the switching of these communication periods and serves to notify the start or end of each communication period to whole of terminals composing the IBSS by transmitting a 20-/40-MHz switching control frame. Each STA in the IBSS performs 20-MHz communication or 40-MHz communication in each communication period, respectively, in accordance with the notification from the switching owner 70.

In each communication period in FIG. 7, for example, the MAC system shown in FIG. 6 is utilized. In the IEEE 802.11 wireless LAN system, since the AP primitively transmits the CF-Poll, the switching owner 70 being one of the STAs of the BSS can not transmit the CF-Poll freely. Therefore, if the MAC system shown in FIG. 6 is used in the IBSS, the IEEE 802.11 wireless LAN system defines a new frame having a structure as same as the CF-Poll or a structure expanding the CF-Poll and defines a Subtype indicating the kind of the new frame in addition to the CF-Poll. This frame is described as a CF-Poll'.

The 20-/40-MHz switching owner can execute the media access system same as that of in FIG. 6 even if it is not the AP of the BSS by using the CF-Poll' instead of the CF-Poll.

Figure 8:
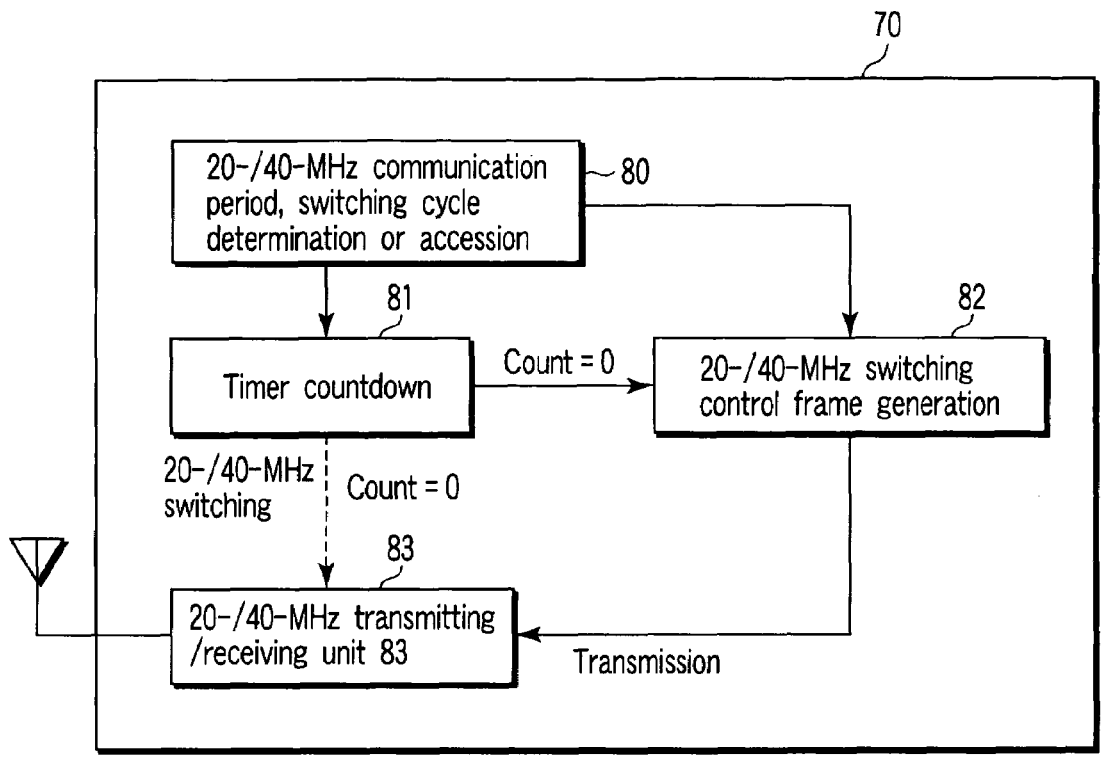
FIG. 8 is an illustration showing a configuration of an another terminal regarding the first embodiment.
Figure 9:
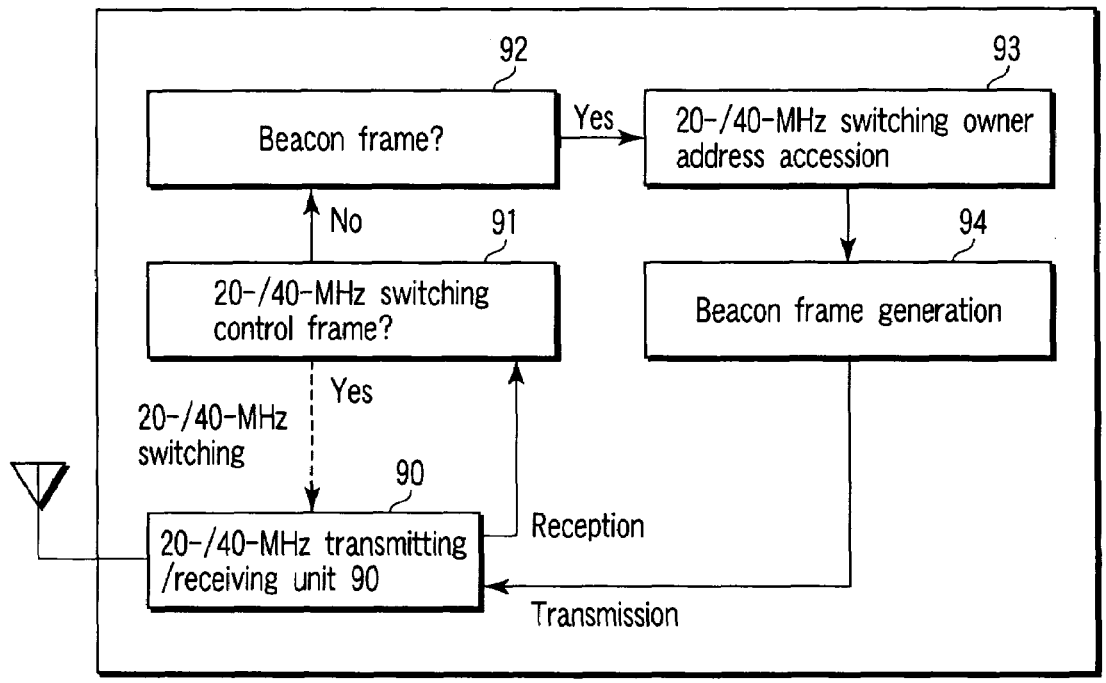
FIG. 9 is an illustration showing an example of use of a frequency channel regarding the first embodiment.

FIG. 8 is a functional block diagram of a STA when it operates as the 20-/40-MHz switching owner, and FIG. 9 is a functional block diagram when the STA operates as a STA other than the 20-/40-MHz switching owner.

As shown in FIG. 8, the switching owner 70 has a function 80 of determining or acquiring a 20-/40-MHz communication period (switching cycle), a timer function 81 and a function 82 of generating the 20-/40-MHz switching control frame. The function 80 and 81 are the functions correspond to the network system management unit 25 in FIG. 1. The function 82 corresponds to the channel occupancy/open control unit 24 in the access control unit 21 shown in FIG. 1. The timer function 81 receives the 20-/40-MHz communication period (switching cycle) from the function 80 to set it to a timer value and starts a countdown operation. When the timer value reaches zero, the timer function 81 instructs the generation of the switching control frame to the function 82 and instructs to a 20-/40-MHz transmitting/receiving unit 83 which of the communication modes of 20 MHz or 40 MHz should be operated. The 20-/40-MHz transmitting/receiving unit 83 is implemented in the physical layer 10 of FIG. 1.

In contrast, as shown in FIG. 9, a STA other than the 20-/40-MHz switching owner has a function 91 of receiving the switching control frame transmitted from the switching owner and switching the communication mode of a 20-/40-MHz transmitting/receiving unit 90 of its own STA. Furthermore, the STA has a function 92 of determining reception of a beacon frame, a function 93 of acquiring a 20-/40-MHz switching owner address, and a function 94 of generating the beacon frame. The 20-/40-MHz transmitting/receiving unit 90 is implemented in the physical layer 10 of FIG. 1. The function 91 and 92 correspond to the channel state management unit 23 in the access control unit 21 shown in FIG. 1. The function 93 corresponds to the network system management unit 25. The function 94 corresponds to the channel occupancy/open control unit 24.

In what follows, it will be described how the STA in the IBSS is selected as the 20-/40-MHz switching owner at every embodiment of the invention. The first embodiment is one in which the STA which has set up the IBSS becomes the 20-/40-MHz switching owner. The STA which has set up the IBSS is, in other words, the STA which has primarily started direct communication.

Figure 10:
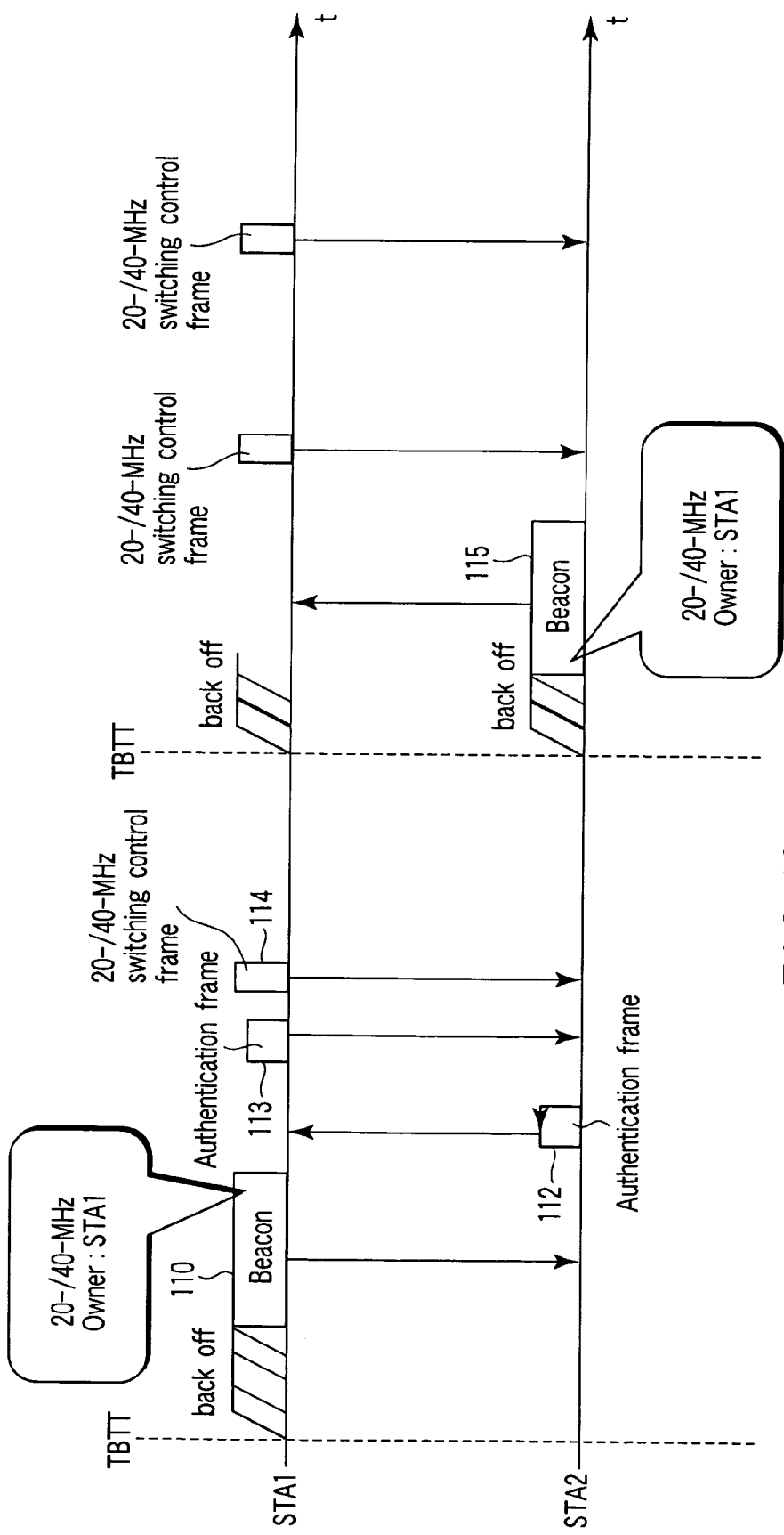
FIG. 10 is an illustration explaining a procedure of selection of a 20-/40-MHz switching owner regarding the first embodiment.
Figure 11:
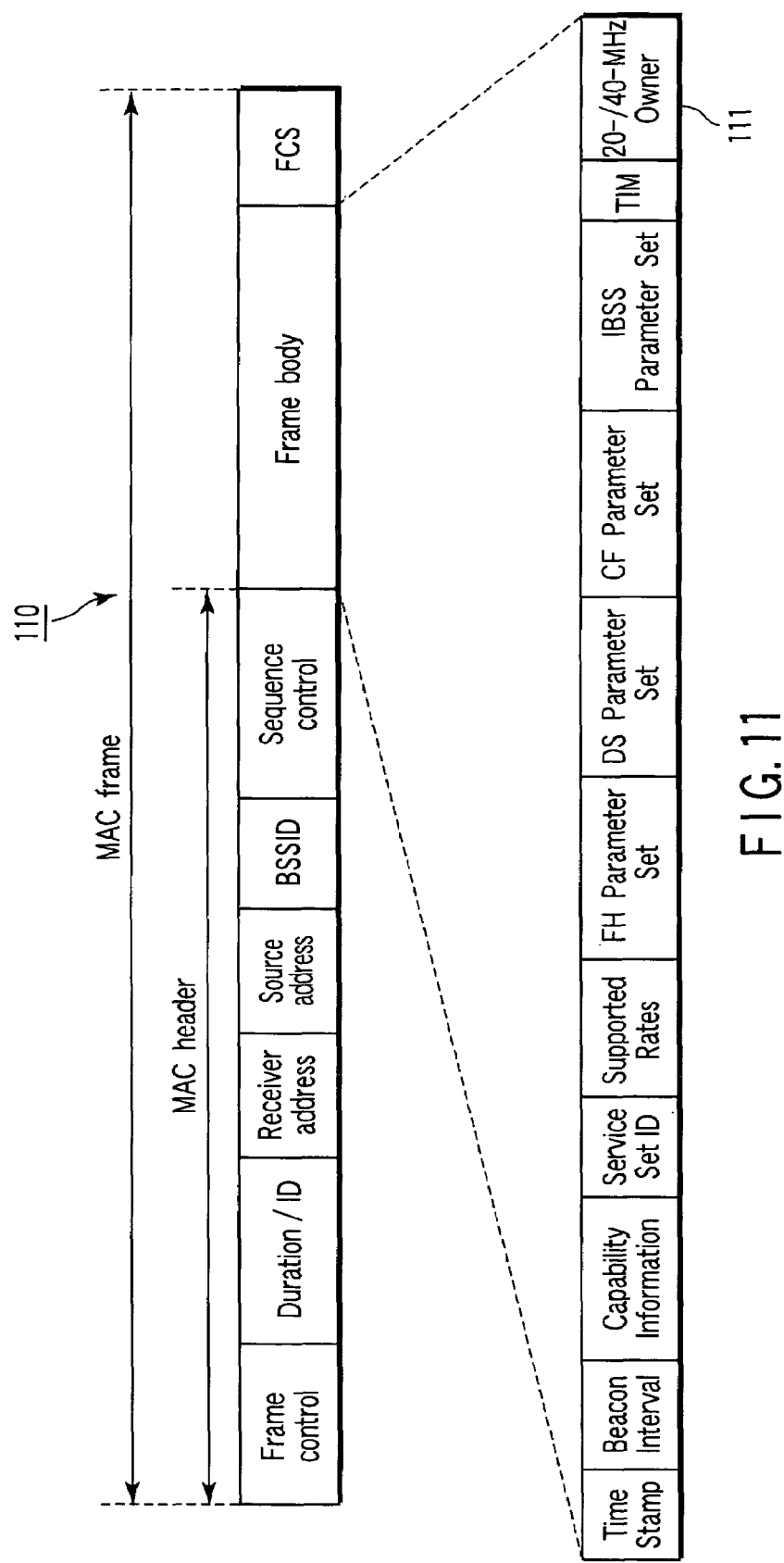
FIG. 11 is an illustration showing a configuration of a beacon frame regarding the first embodiment.

Procedures of selecting of the switching owner in the IBSS in the IEEE 802.11 wireless LAN system will be described by referring to FIG. 10 regarding the first embodiment. In these procedures, for example, it is assumed that a STA 1 sets up the IBSS. The STA 1 broadcasts a beacon frame 110 at first. FIG. 11 shows a form of the beacon frame 110 used in the first embodiment. At this time, the STA 1 transmits the beacon frame 110 by using the channel (20M_ch_a) of 20 MHz. The beacon frame 110 is provided with a 20-/40-MHz switching element 111, and the STA 1 to start the IBSS stores an address of its own STA as the address of the 20-/40-MHz switching owner into the element 111. Each STA which has received the beacon frame 110 can acquire the address of the switching owner, based on the element 111. The STA 1 to start the IBSS may determine parameter values such as a length and a switching cycle of the 20-/40-MHz communication period and store the parameter values into another element of the beacon frame 110 to transmit them. The STA 1 starts switching control of 20-/40-MHz communication after transmitting the beacon frame 110. In the first embodiment, only the STA 1 transmits a 20-/40-MHz communication switching control frame 114 and the switching control is performed intensively.

On the other hand, a STA 2 which expects to enter the IBSS detects the beacon frame 110 of the STA 1 and transmits an authentication frame 112 to authenticate wireless terminal stations to the STA 1 by using the 20M_ch_a. After that, the authentication between the STA 1 and the STA 2 is established by transmitting the authentication frame 112 from the STA 1 to the STA 2 and the STA 2 can enter into the IBSS. The STA 2 can acquire the presence or absence of the switching owner and an address of the switching owner with reference to the beacon frame from the STA 1.

In the IBSS, since the beacon frame is transmitted independently and dispersedly all STAs composing the IBSS, the STA 1 which has primarily set up the IBSS does not transmit the beacon frame at every time.

In the first embodiment, it is assumed that the address of the STA 1 which has primarily set up the IBSS as the switching owner is stored into the beacon frame (for example, a beacon frame 115) even if the switching owner is the STA 1 which has set up the IBSS and any other STA transmits the beacon frame. Other STA to transmit a beacon frame can describe an address of the same STA as the switching owner at the time of generation of a beacon frame with reference to the address of the switching owner of the beacon frame transmitted from the other STA.

The parameters such as each communication period length and its start time, a cycle and a switching frequency used for switching between 20-MHz communication and 40-MHz communication by the switching owner is imparted according to explanation described below.

For example, values of parameters such as each communication period and switching cycle of the 20-MHz communication and the 40-MHz communication are made as fixed values in advance. During the existence of the IBSS, the IBSS always uses the values. These parameter values may be determined by the switching owner at the time of start of the IBSS, and the values determined by the BSS in a relationship of parents to the IBSS may be used as these parameter values.

In another example, the switching owner may dynamically change parameter values such as a length and a switching cycle of each communication period. For example, the switching owner can change the parameter values in response to the number of terminals to perform the 20-MHz communication or the 40-MHz communication and its traffic amount.

Figure 12:
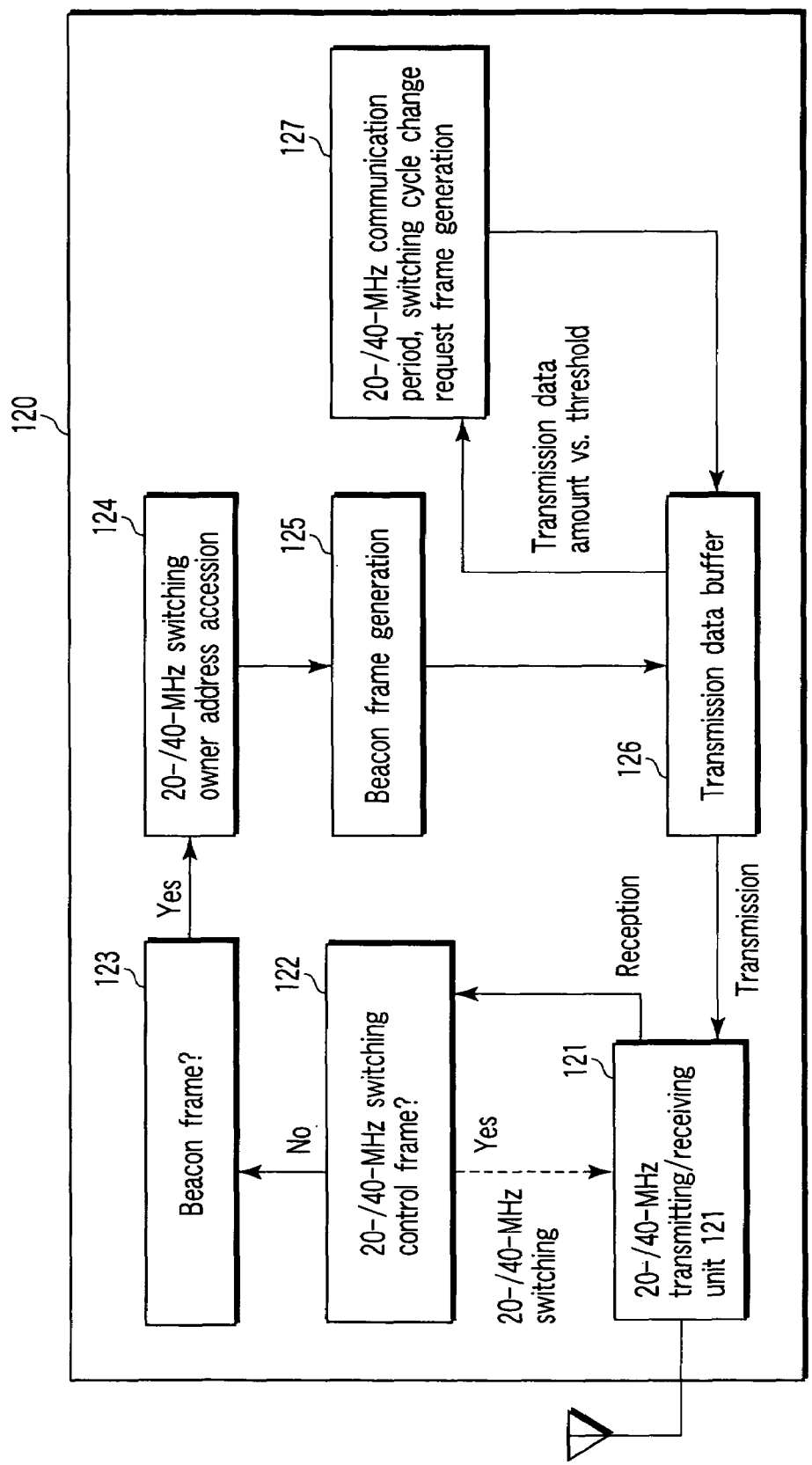
FIG. 12 is an illustration showing a configuration of other terminal regarding the first embodiment.

It is preferable that the STA other than the switching owner in the IBSS can require the change of lengths and the switching cycles of each communication period to the switching owner thorough the transmission of the request frame. FIG. 12 shows the functional block diagram in the case described just above. A terminal 120 has a function 127 of generating a request frame to require expansion of the 40-MHz communication period to the switching owner so as to perform high-speed communication using the 40-MHz channel when the transmission data amount stored in the transmission data buffer 126 exceeds the prescribed threshold. Functions 122-125 are identical with the corresponding functions in FIG. 9. The transmission data buffer 126 is implemented in the physical layer 10 of FIG. 1. The function 127 corresponds to the channel occupancy/open control unit 24 of FIG. 1.

The switching owner may vary the length or the switching cycle of each communication period in response to contents of requests for change when receiving the change request frame of the length or the switching cycle of each communication period, and may continuously use the previous values by rejecting the request depending on the contents of the request and without varying the parameter values.

Next, with respect to switching between 20 MHz and 40 MHz, the switching owner transmits a 20-/40-MHz switching control frame essentially, based on the request from the STA in the IBSS. That is, the switching owner starts transmission of the CTS self in FIG. 6 and executes a shift to the 40-MHz communication period only when receiving the 40-MHz communication request frame from a STA. This is a system in which a STA only performing the 20-MHz communication as usual in the IBSS and desiring the high-speed 40-MHz communication because of having a large amount of transmission data transmits a request frame for the 40-MHz communication to the switching owner.

In contrast, the usual communication in the IBSS is performed as the 40-MHz communication and the 40-MHz communication is shifted to the 20-MHz communication only in accordance with a request from a STA.

In the first embodiment, during the forming of the IBSS, the switching owner is the STA which has started the IBSS. Resulting form a certain situation such as break of wireless waves due to shortage of electric power of a battery or movement of the STA, the switching owner would exit from the IBSS. Therefore, if the original STA being the switching owner exits from the IBSS, a 20-/40-MHz switching owner being a successor is selected and intensive switching control for the 20-/40-MHz communication is maintained.

For example, when the switching owner exits from the IBSS, on of STAs composing the IBSS is selected as the switching owner to be a successor. An element such as physical capability owned by each STA or transmission data amount stored by each STA becomes reference to select the switching owner. The switching owner transmits a frame with the 20-/40-MHz switching control right transfer data stored therein and notifies the fact of selection as the switching owner to the selected STA. The selected STA receives the right transfer frame and replies a switching control right acceptance frame to the switching owner if possible. The switching owner may notify the address of a new 20-/40-MHz switching owner to all STAs in the IBSS though broadcast after receiving the right acceptance frame form the STA selected as the successor. Whereby, when each STA transmits beacon frames, the addresses of the switching owner to be described in the beacon frames can be updated to the latest information.

When the switching owner exits from the IBSS, the following example becomes considerable as a selection method for the 20-/40-MHz switching owner to be the successor. At first, the switching owner broadcasts a shifting request frame of a 20-/40-MHz switching owner before exiting from the IBSS. Conditions such as STA capability necessary for becoming the switching owner are described in the switching request frame. If the STA which has received the switching request frame satisfies the conditions, the STA replies a 20-/40-MHz switching owner candidate frame to the switching owner or broadcasts it. A STA capability of its own STA is described in the candidate frame.

The switching owner receives 20-/40-MHz switching owner candidate frames from each STA and selects one STA as the successor. In the selection method, the switching owner may use the STA capabilities described in the candidate frames and may use other method. The switching owner transmits the right transfer frame to the corresponding STA after selecting the STA being the successor. The successor STA actually starts switching control between the 20-MHz communication and the 40-MHz communication after receiving the right transfer frame.

After the completion of the procedures described above, either the switching owner or the successor STA may notifies the address of the new switching owner through broadcast to all STAs in the IBSS.

In the method mentioned above, if a plurality of STAs become candidates for the switching owner, the switching owner selects its successor STA. In addition to this method, a system is considered that each candidate STA competes with one another and the STA being the final winner finally obtains a 20-/40-MHz switching control right.

For example, a specified time competition period is provided after the switching owner broadcasts the shifting request frame. The length of the competition period may be described, for example, in the shifting request frame. The STA becoming a candidate for a 20-/40-MHz switching owner broadcasts a 20-/40-MHz switching owner candidate frame to STAs in the IBSS during the competition period. At this time, each STA determines the number of transmission times of the candidate frame in response to the scale of necessity to be the switching owner in advance and tries to transmit by the number of transmission times during the competition period.

The necessity to be the switching owner can determine, for example, in response to an amount of transmission data owned by each STA. The STA having higher necessity to be the switching owner sets the large number of transmission times, then, the possibility of continuous transmission of the candidate frames until the end of the competition period increases. The STA which has kept on transmission the candidate frames until the end of the competition period obtains the switching control right and becomes the next switching owner.

Or, it is preferable to perform a self-control operation such that if a STA having a capability higher than its own STA exists by mutually checking STA capabilities in the candidate frames, its own STA does not transmit candidate frame. In this case, the STA which has kept on the transmission of the candidate frames until the end of the competition period also obtains the control right and becomes the next 20-/40-MHz switching owner.

When the switching owner exits from the IBSS, the case in which the switching owner does not select a switching owner to be its successor and exits without doing anything would be considered. In such a case, the STA which detects the absence of the switching owner in the IBSS can become a new 20-/40-MHz switching owner.

If a plurality of STAs detect the absence of the switching owner, for example, the above mentioned competition among the STAs is performed and the STA of the final winner may become a new switching owner. However, if the switching owner has existed from the IBSS without doing anything, since the competition period has not been set, the STA which primarily detects the absence of the switching owner broadcasts the competition period start frame into the IBSS. Thereby, the same procedures as described above can be started. In this case, the STA which has primarily detected the absence of the switching owner determines the length of the competition period and describes the length in a competition period start frame.

A method for detecting the absence of the switching owner is considered, in which the switching between the 20-MHz communication and the 40-MHz communication is not performed at all during a specified period. If each STA does not receive a 20-/40-MHz communication switching control frame from the switching owner during a specified period in advance, each STA determines that the switching owner has exited from the IBSS and determines a new switching owner according to the method mentioned above.

As another method for detecting the absence of the switching owner, the case is considered, in which the switching owner does not reply to a specific event to which the switching owner should respond. For example, if the switching owner receives a request frame for the 40-MHz communication from a STA, the case of communication procedures is considered, in which the switching owner transmits the control information to switch from the 20-MHz communication to the 40-MHz communication. The STA sets a timer in a 40-MHz communication request frame to transmit the request frame, then, if the switching owner does not transmit control information to switch from the 20-MHz communication to the 40-MHz communication within the time set in the timer, the STA determines that the switching owner has already exited from the IBSS. Or, if the switching owner does not respond after several numbers of times of transmission of the request frame against the request frame for the 40 MHz communication, the STA determines that the switching owner has already exited from the IBSS.

After this, a new 20-/40-MHz switching owner is determined in accordance with the method described above.

According to the first embodiment as explained above, in the IBSS for making direct communication wireless terminal stations without passing through the central control station, the MAC for a plurality of channels having different bandwidths coexisting in the same frequency band can be performed.

Second Embodiment

The first embodiment shows the case that the STA which has set up the IBSS becomes the 20-/40-MHz switching owner, and a second embodiment shows the case that the STA which has successfully transmitted a beacon frame becomes the switching owner.

The beacon frame in the IBSS is independently and dispersedly transmitted among all STAs composing the IBSS. The STA which has primarily set up the IBSS determines a beacon cycle in the IBSS and the value of the beacon cycle is described in the beacon frame and a probe response frame. The STA entering into the IBSS refers to the beacon cycle set in the beacon frame and the response frame.

In the IBSS, a timing synchronization function (TSF) timer is reset to zero at every target beacon transmission time (TBTT), and each STA tries to transmit the beacon frame at the timing of the reset in accordance with the following procedures.

Figure 13:
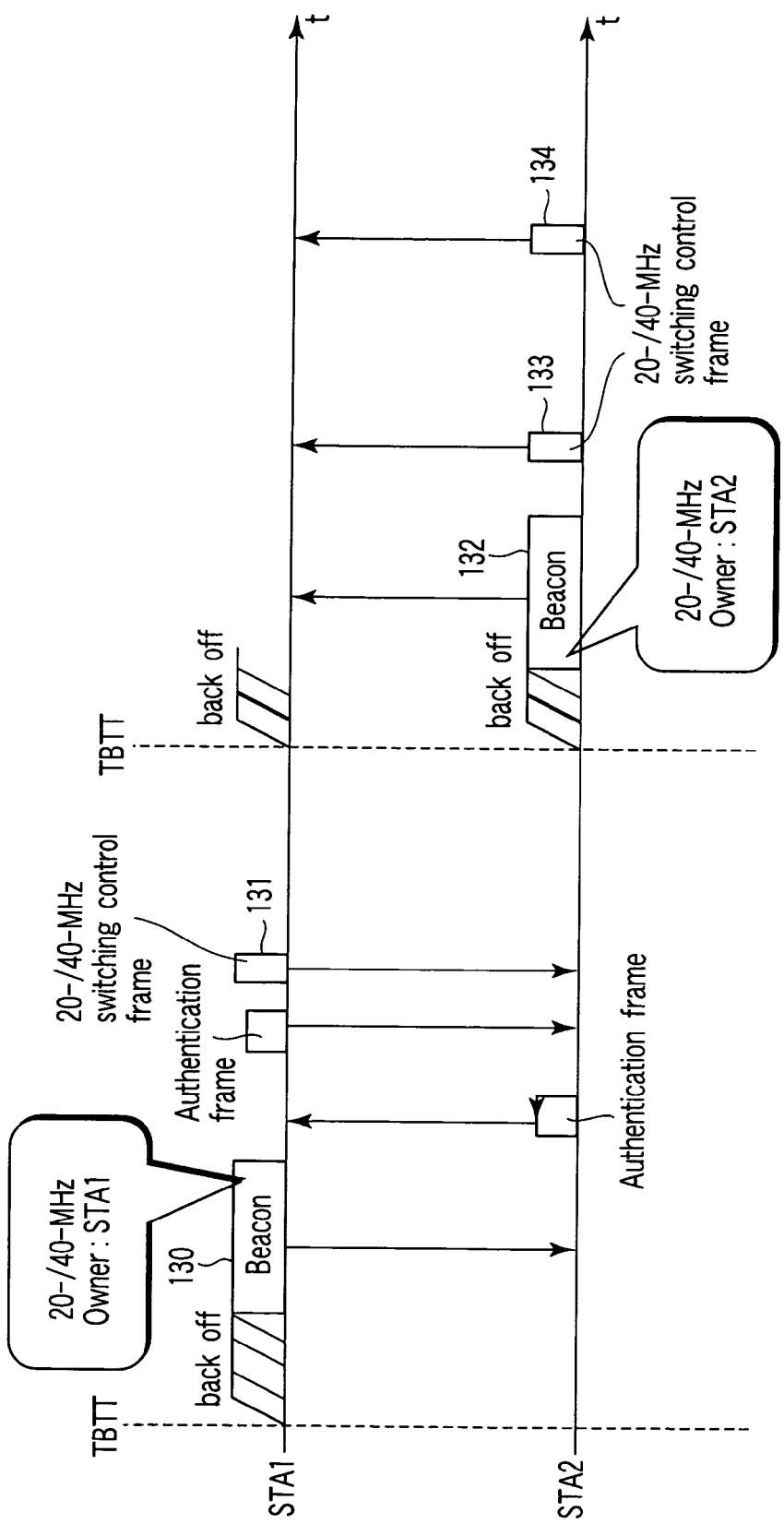
FIG. 13 is an illustration explaining a procedure of selection of a 20-/40-MHz switching owner regarding a second embodiment.

Procedures for selecting the switching owner in the second embodiment will be described with referring to FIG. 13 regarding the second embodiment.

At first, each STA interrupts frames other than the beacon frames at the TBTT. Each STA generates beacon frames to try the transmission thereof and stores their own STA addresses as the switching owner into the beacon frames. The parameters such as each length of communication periods, switching cycle and the number for switching times can be also described into the beacon frames, respectively. After this, each STA starts countdown of back off counters, and transmits the beacon frames by using the 20-MHz channel when the counters reach zero. If each STA receives the beacon frame transmitted from other STA before the counter reaches zero, each STA cancels the transmission of its own beacon frame.

In the procedures of the second embodiment, since each STA stores its own STA address as the switching owner into the beacon frame, the STA which has obtained a beacon transmission right transmits the beacon frame with its own STA address stored therein. Accordingly, the STA which is the winner of back off, that is, the STA which successfully obtained the transmission right becomes the switching owner during a beacon interval succeeding the beacon transmission. The STA to be the switching owner can notify the fact that the STA itself is the switching owner during the beacon interval succeeding the beacon transmission to other STAs in the IBSS by storing the own STA address as the switching owner into the beacon frame.

In the second embodiment, different STAs can be the switching owners at every beacon interval. In an example in FIG. 13, a STA 1 which has been the winner of back off and transmitted a beacon frame becomes the switching owner during a beacon interval succeeding the transmission of a beacon frame and transmits a 20-/40-MHz switching control frame 131. During the next beacon interval, an STA 2 is a winner of the back off and it transmits a beacon frame 132. Moreover, the STA 2 becomes the switching owner and transmits 20-/40-MHz switching control frame 133, 134, etc.

In the case of the IBSS, since the STA which has become the winner of the back off transmits a beacon frame to the TBTT, there is a possibility more than two STAs transmit the beacon simultaneously. In this case, any one of the STAs may become the switching owner by competition or two or more STAs may become the switching owners among competitive STAs.

If parameters such as the lengths, switching cycles and switching frequencies of each communication period of the 20-/40-MHz communication are defined as fixed values in advance, the fixed values defined in advance are always constantly continued to be used during the presence of the IBSS even if the switching owners are different or the beacon intervals are different. That is, each STA describes the same parameter values into the beacon frame and the lengths and the switching cycles of each communication period are same even if any STA becomes the switching owner resulting from the back off.

The switching owner may determine the lengths and switching cycles of each communication period at the time of start of the IBSS and the BSS which has been the parents of the IBSS may determine them in advance.

With reference to the beacon frame, all STAs can know set values of the lengths and the switching cycles and perform switching control of the 20-/40-MHz communication on the basis of the set values even if any STA becomes the switching owner.

Each switching owner may drastically vary the lengths and switching cycles of each communication period. For example, the lengths and switching cycles may be varied in response to the number of terminals and traffic amount performing the 20-MHz communication or the 40-MHz communication. In this case, the STA which has become a winner of the back off and become the switching owner determines the lengths and the switching cycles of each communication period and controls the switching of the 20-/40-MHz communication during the beacon interval succeeding the transmission of the beacon frame.

In the case of the second embodiment, since different STAs can be the switching owner at every beacon interval, the lengths and the switching cycles of each communication period would differ at every beacon interval.

The STA composing the IBSS other than the switching owner can transmit a change request for the lengths and switching cycles of each communication period to the switching owner. When the switching owner receives the change request for the lengths and switching cycles of each communication period, the switching owner may vary the lengths or switching cycles in response to contents of the request or continuously use the same values without varying them.

In the second embodiment, the switching owner can vary the lengths of the switching cycles of each communication period only during the beacon interval in which its own STA acts as the switching owner.

The second embodiment described above can also perform MAC for a plurality of channels having different bandwidths coexisting in the same frequency band in the IBSS in which wireless terminal stations perform direct communication with one another without passing through a central control station.

Third Embodiment

The first embodiment shows the case that the STA which has set up the IBSS becomes the 20-/40-MHz switching owner, and the second embodiment shows the case that the STA which has successfully transmitted the beacon frame becomes the switching owner. A third embodiment of the invention is the one in which a STA which desires to perform data transmission through a 40-MHz channel becomes a 20-/40-MHz switching owner.

In the IBSS, 20-MHz communication is usually performed, and switching between 20-MHz communication and 40-MHz communication is not necessary. Therefore, in the third embodiment, the switching owner is not specified. In such an IBSS, if an amount of transmission data owned by a certain STA is large and the STA desires to perform high-speed communication through the 40-MHz communication, the STA itself becomes the 20-/40-MHz switching owner to switch the communication in the IBSS from the 20-MHz communication to the 40-MHz communication.

At first, each STA checks transmission buffer in their own STA, and if the amount of the transmission data stored in the buffer is larger than the prescribed threshold, each STA broadcasts 20-/40-MHz switching owner candidate frames into the IBSS, respectively.

If the STA which has broadcasted the candidate frame has not received any candidate frame from other STAs during a subsequent and specified period, its own STA becomes the switching owner and starts to transmit control information for switching the channel from the 20-MHz communication to the 40-MHz communication.

If a plurality of STAs become candidates for the switching owners, for example, each STA competes as mentioned in the first embodiment, and the STA which has become the final winner might be a new switching owner.

In this case, the STA which has primarily become the candidate for the switching owner broadcasts a competition period start frame into the IBSS. Consequently, the STA which has become the new switching owner can start the similar competition procedures as those of the first embodiment. In this case, the STA which has primarily become the candidate for the switching owner determines the length of the competition period and describes it in a competition period start frame.

The third embodiment described above can also perform MAC for a plurality of channels having different bandwidths coexisting in the same frequency band in the IBSS in which wireless terminal stations perform direct communication with one another without passing through a central control station.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication system having a plurality of wireless terminal stations to perform direct communication without passing through a wireless base station, comprising:
   a first wireless communication station configured to perform only a first wireless communication using a first channel having a first frequency band;
   a plurality of second wireless communication stations each capable of performing not only the first wireless communication but a second wireless communication using a second channel having a second frequency band with a bandwidth greater than that of the first frequency band;
   a generation device configured to generate a switching control frame to control switching between a communication period by the first wireless communication and a communication period by the second wireless communication; and
   a communication control device configured to control one of the second wireless communication stations so as to transmit the switching control frame generated by the generation device,
   wherein the one of the second wireless terminal stations is selected, based on a beacon frame transmitted through the first wireless communication, as a temporal central control station having a switching control right to control switching between the first wireless communication and the second wireless communication.

2. The wireless communication system according to claim 1, wherein one of the second wireless terminal stations which has primarily started the direct communication is selected as the temporal central control station.

3. The wireless communication system according to claim 1, wherein one of the second wireless terminal stations which has successfully transmitted a beacon frame after back off regarding access control of a wireless communication medium is selected as the temporal central control station.

4. The wireless communication system according to claim 3, wherein the temporal central control station is changed at every beacon interval.

5. The wireless communication system according to claim 1, wherein the temporal central control station specifies any one of the second wireless terminal stations and transfers the switching control right to the specified wireless terminal station.

6. The wireless communication system according to claim 5, wherein said any one of the second wireless terminal stations is specified on the basis of physical capability of the wireless terminal station.

7. The wireless communication system according to claim 1, wherein one of the second wireless terminal stations which has requested a start of the second wireless communication is selected as the temporal central control station.

8. The wireless communication system according to claim 1, wherein one of the second wireless terminal stations which has detected abandonment of the switching control right is selected as the temporal central control station.

9. The wireless communication system according to claim 1, in which one of the second wireless terminal stations which has detected absence of the temporal central control station is selected as the temporal central control station.

10. The wireless communication system according to claim 9, wherein the absence of the temporal central control station is detected by the fact that the switching between the communication period by the first wireless communication and the communication period by the second wireless communication does not occur at all in a beacon interval.

11. The wireless communication system according to claim 9, wherein the absence of the temporal central control station is detected on the basis of waiting time of a response frame from the temporal central control station corresponding to a request frame to the temporal central control station.

12. The wireless communication system according to claim 5, wherein the temporal central control station is selected by competition from the second wireless terminal stations.

13. The wireless communication system according to claim 1, wherein the communication period of the first wireless communication and the communication period of the second wireless communication are fixed in length and the communication periods are switched periodically.

14. The wireless communication system according to claim 1, wherein the temporal central control station varies at least any one of lengths or switching cycles of the communication period of the first wireless communication and the communication period of the second wireless communication.

15. The wireless communication system according to claim 14, wherein the temporal central control station varies at least any one of lengths or switching cycles of the communication period of the first wireless communication and the communication period of the second wireless communication in response to a change request frame from a wireless terminal station other than the temporal central control station.

16. The wireless communication system according to claim 1, wherein the temporal central control station executes switching control between the communication period by the first wireless communication and the communication period by the second wireless communication only when the temporal central control station receives a change request frame from a wireless terminal station other than the temporal central control station.

17. A wireless communication method wherein a first wireless communication station and a plurality of second wireless communication stations perform direct communication without passing through a wireless base station, the first wireless communication station being configured to perform only a first wireless communication using a first channel having a first frequency band and the plurality of second wireless communication stations each being capable of performing not only the first wireless communication but a second wireless communication using a second channel having a second frequency band with a bandwidth greater than that of the first frequency band, the method comprising:
    generating a switching control frame to control switching between a communication period by the first wireless communication and a communication period by the second wireless communication; and
    controlling one of the second wireless communication stations so as to transmit the switching control frame generated by the generation device,
    wherein the one of the second wireless terminal stations is selected, based on a beacon frame transmitted through the first wireless communication, as a temporal central control station having a switching control right to control switching between the first wireless communication and the second wireless communication.

18. A wireless communication system having a plurality of wireless terminal stations to perform direct communication without passing through a wireless base station, comprising:
    a first wireless communication station configured to perform only a first wireless communication using a first channel having a first frequency band;
    a plurality of second wireless communication stations each capable of performing not only the first wireless communication but a second wireless communication using a second channel having a second frequency band with a bandwidth greater than that of the first frequency band;
    a generation device configured to generate a switching control frame to control switching between a communication period by the first wireless communication and a communication period by the second wireless communication; and
    a communication control device configured to control one of the second wireless communication stations so as to transmit the switching control frame generated by the generation device,
    wherein the one of the second wireless terminal stations is selected, based on a control frame transmitted through the first wireless communication, as a temporal central control station having a switching control right to control switching between the first wireless communication and the second wireless communication, and wherein the control frame includes an element indicating an address of the temporal central control station.

19. The wireless communication system according to claim 18, wherein the one of the second wireless terminal stations which has successfully transmitted the control frame after back off regarding access control of a wireless communication medium is selected as the temporal central control station.

20. The wireless communication system according to claim 18, wherein the temporal central control station varies at a fixed transmission cycle of the control frame.

21. A wireless communication method wherein a first wireless communication station and a plurality of second wireless communication stations perform direct communication without passing through a wireless base station, the first wireless communication station being configured to perform only a first wireless communication using a first channel having a first frequency band and the plurality of second wireless communication stations each being capable of performing not only the first wireless communication but a second wireless communication using a second channel having a second frequency band with a bandwidth greater than that of the first frequency band, the method comprising:

generating a switching control frame to control switching between a communication period by the first wireless communication and a communication period by the second wireless communication; and controlling one of the second wireless communication stations so as to transmit the switching control frame generated by the generation device, wherein the one of the second wireless terminal stations is selected, based on a control frame transmitted through the first wireless communication, as a temporal central control station having a switching control right to control switching between the first wireless communication and the second wireless communication, and wherein the control frame includes an element indicating an address of the temporal central control station.

* * * * *